US006850658B2

(12) United States Patent
Golwalkar et al.

(10) Patent No.: US 6,850,658 B2
(45) Date of Patent: *Feb. 1, 2005

(54) APPARATUS FOR COUPLING AN OPTOELECTRONIC DEVICE TO A FIBER OPTIC CABLE AND A MICROELECTRONIC DEVICE, A SYSTEM INCLUDING THE APPARATUS, AND A METHOD OF FORMING THE SAME

(75) Inventors: Suresh Golwalkar, Phoenix, AZ (US); Noah Davis, Los Angeles, CA (US); John Burns, Harbor City, CA (US); Jonathan McFarland, Phoenix, AZ (US); Kevin Cote, Ocotillo, AZ (US)

(73) Assignee: Primarion, Inc., Tempe, AZ (US)

( * ) Notice: Subject to any disclaimer, the term of this patent is extended or adjusted under 35 U.S.C. 154(b) by 246 days.

This patent is subject to a terminal disclaimer.

(21) Appl. No.: 10/056,757

(22) Filed: Jan. 23, 2002

(65) Prior Publication Data

US 2002/0114588 A1 Aug. 22, 2002

Related U.S. Application Data

(63) Continuation-in-part of application No. 09/911,918, filed on Jul. 24, 2001.
(60) Provisional application No. 60/270,387, filed on Feb. 21, 2001, and provisional application No. 60/276,296, filed on Mar. 16, 2001.
(51) Int. Cl.$^7$ .............................. G02B 6/26; G02B 6/24
(52) U.S. Cl. ............................ 385/15; 385/28; 385/88
(58) Field of Search ............................ 385/88, 89, 90, 385/91, 92, 93, 94, 15, 28

(56) References Cited

U.S. PATENT DOCUMENTS

| 5,416,872 | A | 5/1995 | Sizer, II et al. |
| 5,475,215 | A | 12/1995 | Hsu |
| 5,805,756 | A | 9/1998 | Burghardt et al. |
| 6,341,027 | B1 | * 1/2002 | Tatsuno et al. ............. 398/164 |

FOREIGN PATENT DOCUMENTS

| DE | 199 17 554 A1 | 4/1999 |
| EP | 0 901 023 A2 | 3/1999 |

OTHER PUBLICATIONS

Uchida, Teiji and Mikami, Osamu; Optical Surface Mount Technology; Invited Paper; IEICE Trans. Electron., vol. E30–C, Jan. 1, 1997; pp. 81–87.

* cited by examiner

Primary Examiner—Hung Xuan Dang
(74) Attorney, Agent, or Firm—Theodore E. Galanthay (57) ABSTRACT

A device for forming an optical connection between an optoelectronic device and an optical fiber, forming an electrical connection between the optoelectronic device and an integrated circuit, and a forming an electrical connection between the microelectronic device and a substrate, a system including the device, and a method of forming the device and system are disclosed. The device for forming an optical connection includes a light transmission medium and electrical connectors, which are at least partially encapsulated. In addition, the device includes guide grooves configured to receive guide pins from a fiber ribbon connector portion of a fiber ribbon cable assembly, such that when the fiber ribbon connector is attached to the device, the transmission medium provides an optical path between the optoelectronic device and the fiber.

52 Claims, 11 Drawing Sheets

APPARATUS FOR COUPLING AN OPTOELECTRONIC DEVICE TO A FIBER OPTIC CABLE AND A MICROELECTRONIC DEVICE, A SYSTEM INCLUDING THE APPARATUS, AND A METHOD OF FORMING THE SAME

RELATED APPLICATIONS

This application is a continuation-in-part of application Ser. No. 09/911,918, entitled APPARATUS FOR COUPLING A FIBER OPTIC CABLE TO AN OPTOELECTRONIC DEVICE, A SYSTEM INCLUDING THE APPARATUS, AND A METHOD OF FORMING THE SAME, in the name of Golwalkar et al., filed Jul. 24, 2001; and claims benefit of Provisional application Ser. No. 60/270,387, entitled APPARATUS FOR COUPLING A FIBER OPTIC CABLE TO A MICROELECTRONIC DEVICE, A SYSTEM STRUCTURE INCLUDING THE APPARATUS, AND A METHOD OF FORMING THE SAME in the name of Golwalkar et al., filed Feb. 21, 2001; and application Ser. No. 60/276,296, entitled APPARATUS FOR COUPLING A FIBER OPTIC CABLE TO A MICROELECTRONIC DEVICE USING A FUSED FIBER FACEPLATE, A SYSTEM INCLUDING THE APPARATUS, AND A METHOD OF FORMING THE SAME, in the name of Davis et al., filed Mar. 16, 2001.

FIELD OF THE INVENTION

The present invention generally relates to optoelectronic devices. More particularly, the invention relates to apparatus for optically coupling optical fibers to optoelectronic devices and electrically coupling the optoelectronic devices to microelectronic devices such as integrated circuits, systems including the apparatus, and methods of forming the apparatus and system.

BACKGROUND OF THE INVENTION

Fiber optic systems are often used to transmit information such as voice band and data across a network. Such systems include a light transmitting device (e.g., a laser) coupled to a first end of a fiber cable and a light receiving device (e.g., a photodetector) coupled to the other end of the cable; the light emitting and light receiving devices are collectively referred to as optoelectronic devices. In addition, the fiber optic system may also include an optical coupler to increase the efficiency of light transfer between an optoelectronic device and the fiber cable.

Various prior-art techniques and couplers have been developed to optically connect the fiber cable to an optoelectronic device. For example, couplers, including lenses to focus light emitted from a laser toward a fiber cable or from the cable toward a detector have been developed. Systems including such couplers generally require precise alignment of the optoelectronic device, the coupler, and the cable to achieve high-efficiency light transfer. The precision alignment techniques employed to form the systems are typically manual, time consuming and expensive. Thus, improved optical couplers, which do not require or require less manual alignment between various components of the fiber optic system are desired.

An additional problem associated with traditional optical couplers is that the couplers typically do not account for electrical connections between optoelectronic devices and associated integrated circuits (e.g., drivers and/or amplifiers) typically formed on a substrate such as a printed circuit board. The electrical connections between the optoelectronic devices and the integrated circuits are generally formed by attaching the optoelectric device to a flexible substrate, which is in turn attached to the printed circuit board. The flexible substrate allows the optoelectronic device to be manually aligned with the coupler to increase transmission efficiency. However, the use of the flexible substrate may add undesired cost to and require additional space for the fiber optic system. In addition, prior-art optical coupling schemes generally require separate packages for the optoelectronic device and the associated integrated circuit, which increases manufacturing costs, increase overall space requirements of the coupling system, and generally reduces the integrity of signals transmitted between the optoelectronic device and the integrated circuit. Accordingly, improved optical couplers and systems that facilitate electrical connection between an optoelectric device and a microelectronic device such as an integrated circuit within a single package scheme are desired.

SUMMARY OF THE INVENTION

The present invention provides an improved connector or coupler for optically linking optical fibers to optoelectronic devices and for electrically coupling the optoelectronic device to an integrated circuit such as a driver or an amplifier, a system including the coupler, and a method of forming the coupler and system. The way in which the present invention addresses various drawbacks of the now-known fiber optical couplers and connector systems will be addressed in greater detail below. However, in general, the fiber optic cable connector and system of the present invention allow for relatively easy and inexpensive optical coupling of an optoelectronic device to an optical fiber and electrical coupling to a microelectronic device such as an integrated circuit—e.g., an amplifier and/or a driver.

In accordance with one embodiment of the invention, an optical coupler includes a light transmission path and a microelectronic device formed within a single package. In accordance with one aspect of this embodiment, the coupler includes electrical connectors that provide a conductive path between an optoelectronic device attached to the coupler and the microelectronic device. In accordance with a further aspect of the invention, the coupler includes electrical couplers for coupling the coupler and/or microelectronic device to a substrate. In accordance with a further aspect of the invention, the coupler includes at least one guide to facilitate alignment and coupling of the coupler to a fiber cable. In accordance with a further aspect of this embodiment, the light transmission path is formed of a bundle of optical fibers, wherein the core diameter of each of the fibers is less than the core diameter of the optical fibers of the fiber ribbon. In accordance with a further aspect, the coupler includes an encapsulant surrounding at least a portion of the grooves, the transmission path, the electrical connectors and the microelectronic device.

In accordance with another embodiment of the invention, an optical coupler includes a microelectronic device and alignment guides formed within a single package. In accordance with various aspects of this embodiment, the coupler includes electrical connectors for electrically coupling an optoelectronic device to the microelectronic device, a transmission path for optically coupling the optoelectronic device to a fiber cable or the like, and electrical connectors for electrically coupling the coupler to a substrate such as a printed circuit board.

In accordance with another embodiment of the invention, an optoelectronic system includes an optical coupler, an optoelectronic device, an integrated circuit and an optical fiber. The optoelectronic device may be a light emitting (e.g., a laser) or light receiving (e.g., a photodiode) device. The integrated circuit may be a driver for a light emitting optoelectronic device or an amplifier for a light receiving device. In accordance with one aspect of this embodiment, the optical coupler includes electrical connectors and at least one of the optoelectronic devices is electrically coupled to the electrical connectors. In accordance with a further aspect of the invention, the coupler includes an encapsulant that surrounds at least a portion of the integrated circuit. In accordance with a further aspect of the invention, the optical coupler includes guides, and the optical fiber forms part of a fiber ribbon connector that includes guide pins configured to be received by the guides of the optical coupler, such that when the fiber ribbon is attached to the optical coupler, the transmission path of the optical coupler is aligned with the optical fiber(s) of the fiber ribbon. In accordance with yet a further aspect of this embodiment, the system includes a gel compound attached to the optoelectronic device and/or the optical coupler between the optoelectronic device and the optical coupler to increase light transfer between the optical coupler and the optoelectronic device.

In accordance with various embodiments of the invention, a method of forming an optical coupler includes forming electrical connectors from a plate of conductive material, electrically coupling an integrated circuit to the electrical connectors, forming guides, forming a light transmission medium, encapsulating the transmission medium, at least a portion of the electrical connectors, and at least a portion of the integrated circuit, and optionally polishing at least one surface of the transmission medium. In accordance with one aspect of this embodiment, the guides are formed from the plate of conductive material.

In accordance with a further embodiment of the invention, a method of forming an optical interconnect system includes forming an optical coupler, attaching an optoelectronic device to the coupler, and attaching a fiber optic ribbon to the coupler. In accordance with one aspect of this embodiment, the fiber ribbon is removeably attached to the coupler. In accordance with a further aspect of this embodiment, the optoelectronic component is attached to the coupler using solder bump technology, surface mount technology, anisotropic conductive film (ACF), and/or electrical adhesive or metal-metal contact technology.

In accordance with another embodiment of the invention, a method of forming an optical coupler includes forming electrical connectors from a plate of conductive material, attaching an optical transmission medium that is transparent in the region of the radiation spectrum including the visible and the visible to mid infrared wavelengths, attaching a microelectronic device to the electrical connectors, and encapsulating at least a portion of the transmission medium and the microelectronic device.

In accordance with one or more of the embodiments of the present invention, the optical transmission path is coated with anti-reflection material to minimize reflection losses as light travels through the path.

In accordance with further embodiments of the invention, an integrated circuit is attached to the electrical connectors of the coupler using solder bump technology or wirebond technology.

BRIEF DESCRIPTION OF THE DRAWINGS

The present invention is illustrated by way of example and not limitation in the accompanying figures, in which like references indicate similar elements, and in which.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION OF EXEMPLARY EMBODIMENTS

Figure 1:
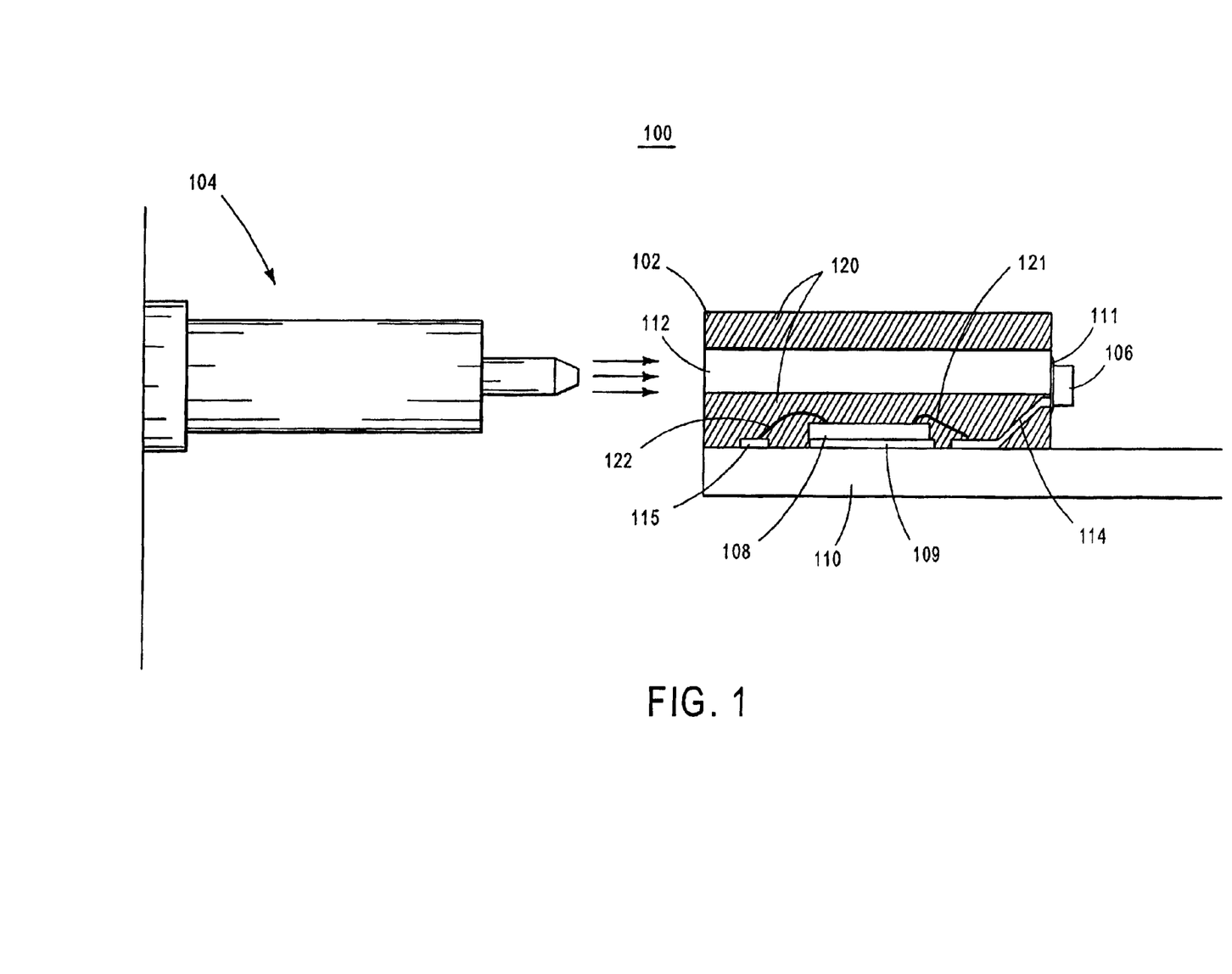
FIG. 1 is a cross-sectional illustration of a portion of an optical interconnect system in accordance with the present invention.

FIG. 1 illustrates a cross-sectional side view of an optical interconnect system 100 in accordance with the present invention. System 100 includes an optical coupler 102, including a microelectronic device 108; a fiber ribbon cable assembly 104; and an optoelectronic device 106. System 100 may also include a substrate 110 such as a printed circuit board or the like, and a gel 111 to facilitate efficient light transfer between device 106 and coupler 102 and to protect a portion of device 106 and coupler 102 from the environment. Although system 100 is illustrated as including a fiber ribbon 104, a system in accordance with the present invention may include a coupler coupled to an optoelectronic device on one side and any suitable waveguide, optical device, photonics devices, or the like on the other side. Optoelectronic device 106 and optical coupler 102 may form part a variety of systems such as, for example, part of a transceiver.

Figure 2:
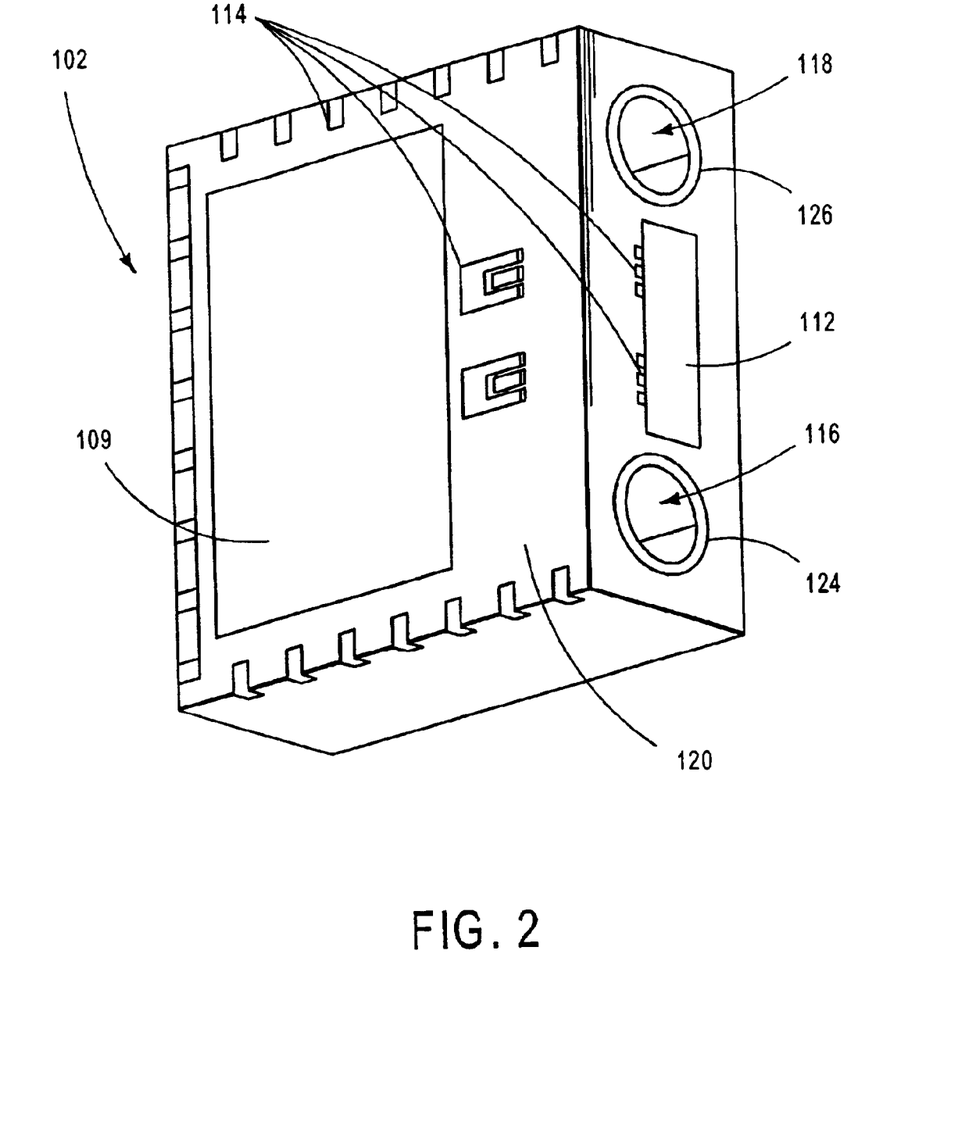
FIG. 2 is a bottom perspective view of an optical coupler in accordance with one embodiment of the present invention.

Coupler 102, illustrated in FIGS. 1 and 2, is configured to facilitate forming an optical connection between an optical fiber of ribbon 104 and optoelectronic device 106, without requiring extensive, labor-intensive adjustment of optoelectronic component 106 or fiber ribbon 104 and to provide an electrical connection between microelectronic device 108 and optoelectronic device 106. In other words, coupler 102 is designed to provide a "self-aligned" optical path between optoelectronic component 106 and fiber ribbon 104 and an internal electrical connection between devices 106 and 108. In addition, in accordance with various embodiments of the invention, coupler 102 also provides an electrical connection between microelectronic device 108 and substrate 110.

In accordance with the illustrated embodiment, coupler 102 includes an optical medium 112, electrical connectors 114 and 115, guides 116 and 118, device 108, a base 109, and an encapsulant 120. Coupler 102 is designed such that encapsulant 120 surrounds and protects at least a portion of device 108 and transmission medium 112. Thus, only one encapsulant or package is required for both optical connections between, device 106 and medium 112 and for electrical connections between device 106 and device 108. Accordingly, system 100 requires less substrate 110 space than typical interconnect systems, and because devices 106 and 108 are proximate each other, system 100 is less susceptible to signal degradation of signals transmitted between device 106 and device 108, compared to typical optical interconnect systems.

Optical transmission medium 112 may be formed of any material that is transparent for the light wavelengths (e.g., visible to mid infra red wavelengths) transferred between device 106 and fibers of ribbon 104. Exemplary medium 112 materials include a glass block, a fiber ribbon, a fiber tape, a holographic optical element, a cavity formed within encapsulant 120, a ferrule or any other suitable waveguide material or optical bus, any of which may include an anti-reflection coating to minimize reflection loss and/or lenses to facilitate efficient light transfer between medium 112 and device 106. In accordance with one embodiment of the invention, medium 112 includes a bundle of fused glass fibers, wherein each of the fibers has a core diameter that is less than the core diameter of a fiber of ribbon 104. For example, when the fibers of ribbon 104 have a core diameter of about 50 micrometers ($\mu$m), the diameter of the fused fibers of medium 112 are preferably about 4 $\mu$m to about 10 $\mu$m. In accordance with another embodiment of the invention, medium 112 comprises optical elements configured to collimate and refocus light. Such optical elements are well suited for forming multiplexing and demultiplexing couplers.

Forming the transmission medium of fused fibers is advantageous because each fiber transmits light directly from one end of the fiber to the other, without dispersion of light. Thus, multiple optoelectronic devices 106 can be coupled to a single fused-fiber transmission medium and transmit or receive light to or from the medium, without interference from the light transmission of neighboring optoelectronic devices or fibers of ribbon 104. Furthermore, because the diameter of the individual fused fibers is less than the core diameter of a fiber of ribbon 104, assembly of system 100, such that optoelectronic device 106 and fiber of ribbon 104 are in optical alignment, is relatively easy.

The dimensions of transmission medium 112 may vary from application to application and depend on such factors as the configuration of the optoelectronic device, the composition of the transmission medium and the like. However, in accordance with one embodiment of the invention, medium 112 includes fused fibers and has overall dimensions of about 3.1 mm wide, about 450 micron high, and about 2 mm long (along the length of the fused fibers). As discussed in more detail below, the dimension of transmission medium 112 and other coupler components may be selected such that the coupler may be scaled to couple to any number of optoelectronic components (e.g., one dimensional, 1-D, or two dimensional, 2-D, arrays of emitters and/or detectors).

As noted above, coupler 102 provides a conductive path between optoelectronic device 106 and microelectronic device 108 and between device 108 and substrate 110. In accordance with the embodiment illustrated in FIG. 1, the conductive path between devices 106 and 108 is formed using electrical connector 114 and a wire bond 121 and the conductive path between device 108 and substrate 110 is formed using electrical connector 115 and a wire bond 122. In accordance with alternate embodiments of the invention, conductive paths between devices 106 and 108 and/or between device 108 and substrate 110 may be formed using other forms of electrical connectors such as conductive vias formed within a substrate, conductive bumps (examples illustrated in FIGS. 6–7 and 15–19), surface mount technology, ACF, or the like.

As explained in greater detail below, connectors 114 may be formed from a sheet or plate of conductive material by patterning and forming or bending the conductive material to eventually form a conductive path with an effective ninety degree electrical bend. The effective ninety degree electrical bend is advantageous because several optoelectronic devices such as vertical cavity surface emitting lasers (VCSELs) emit light in the direction of the surface upon which electrical contacts of the device are formed. With several prior art optoelectronic coupler systems, the VCSEL is bonded directly to the substrate, without a bend in the electrical connector, and the light is bent ninety degrees using relatively complicated and expensive optical couplers.

Electrical connectors 114 are generally configured such that when optoelectronic device 106 is electrically coupled to coupler 102, the light output or input section of device 106 is aligned with medium 112 and to a desired fiber of ribbon 104. Therefore, the spacing and dimensions of connectors 114 is often determined by the optoelectronic devices attached to the connectors. In accordance with one embodiment of the invention, connectors 114 are formed of a conductive metal plate (e.g., copper) having a thickness of about 70 $\mu$m and are spaced about 125 $\mu$m apart. Connectors 114 may also include additional material such as gold to facilitate bonding to optoelectronic device 106 as well as to wirebonds 121 or other conductive connections such or conductive bumps or the like. Connectors 114 may also include additional material such as solder to facilitate bonding to substrate 110.

Connectors 115 and base 109 may be formed of the same material used to form connectors 114. For example, connectors 115 may be formed of the same conductive plate material used to form conductors 114. Base 109 may be used exclusively to receive device 108, or base 109 may form a heat sink and/or additional electrical connections to substrate 110.

Guides 116 and 118 are generally configured to facilitate alignment between coupler 102 and fiber ribbon 104, such that fibers of ribbon 104 are optically aligned with transmission medium 112 of coupler 102. In accordance with the illustrated embodiment, guides 116 and 118 are designed to receive pins or protrusions from ribbon 104, such that the fibers of ribbon 104 align with medium 112 and to optoelectronic devices 106. In accordance with one embodiment of the invention, ribbon 104 includes guide pins as are typically found on MT series of fiber connectors 122, and guides 116 and 118 are formed of tubes 124 and 126, which eventually form cavity regions within encapsulant 120. Tubes 124 and 126 may be formed of any suitable material. For example, tubes 124 and 126 may be formed of molded plastic or conductive material used to form connectors 114.

Encapsulant 120 is generally configured to provide insulation between couplers or connectors 114 and to provide a protective environment around medium 112, at least a portion of connectors 114, and at least a portion of device 108. Exemplary encapsulant 120 materials include transfer mold compound, ceramic material, and other suitable materials. In accordance with one embodiment of the invention, encapsulant 120 is formed of silica-filled epoxy. In accordance with another embodiment, encapsulant 120 includes Glob Top. Because a single encapsulant is used to protect both medium 112 and device 108, less substrate 110 space is required for: optical integration of device 106 and medium 112, electrical integration of devices 106 and 108, and electrical integration of device 108 and substrate 110.

Gel 111 may include any suitable optically transparent material. In accordance with one embodiment of the invention, gel 111 includes a clear organic material having an index of refraction that is "index matched" to the index of refraction of transmission medium 112 and to a portion of optoelectronic device 106. In this context, "indexed matched" means that the index of refraction of material 111 is the same or about the same as the index of refraction of either transmission medium 112 and/or a portion of the optoelectronic device, or the index refraction of gel 111 is between the index of refraction of the transmission medium 112 and a portion of the optoelectronic device.

Optoelectronic or photonics device 106 may include any suitable light emitting or light detecting device. For example, device 106 may include light emitting device such as a light emitting diode, an edge emitting laser, a VCSEL, a distributed feedback laser, a distributed Bragg reflective light source, or the like. If device 106 is a light detecting device, device 106 may include a photo detector such as reversed-biased pn junction diodes, p-i-n diode, metal-semiconductor-metal (MSM) detector, a resonant cavity enhanced detector, a liquid crystal display, or the like. Devices 106 may be a discrete component or assembled in a 1-D or 2-D array. Furthermore, device 106 may be configured to emit or detect light of any desired wavelength; however, device 106 is preferably designed to emit or detect light of one or more wavelengths in the mid infrared to and including the visible radiation spectrum.

When system 100 includes more than one optoelectronic device, the optoelectronic devices may comprise any combination of light emitting and light detecting devices. By way of one particular example, four light emitting and four light detecting devices may be coupled to coupler 102, such that information may be transmitted to and received from ribbon 104 using devices 106.

Microelectronic device 108 may include an integrated circuit or discrete component that couples to device 106. In accordance with various embodiments of the present invention, device 108 includes an amplifier if one or more of devices 106 is an detector, a driver if one or more of devices 106 is an emitter, and a combination of an amplifier and a driver if devices 106 include both detectors and emitters.

Substrate 110 may include any suitable material. Exemplary substrate materials include FR-4 printed circuit board materials, epoxy compounds such as BT, ceramic materials, flexible substrates, silicon, and the like.

Figure 3:
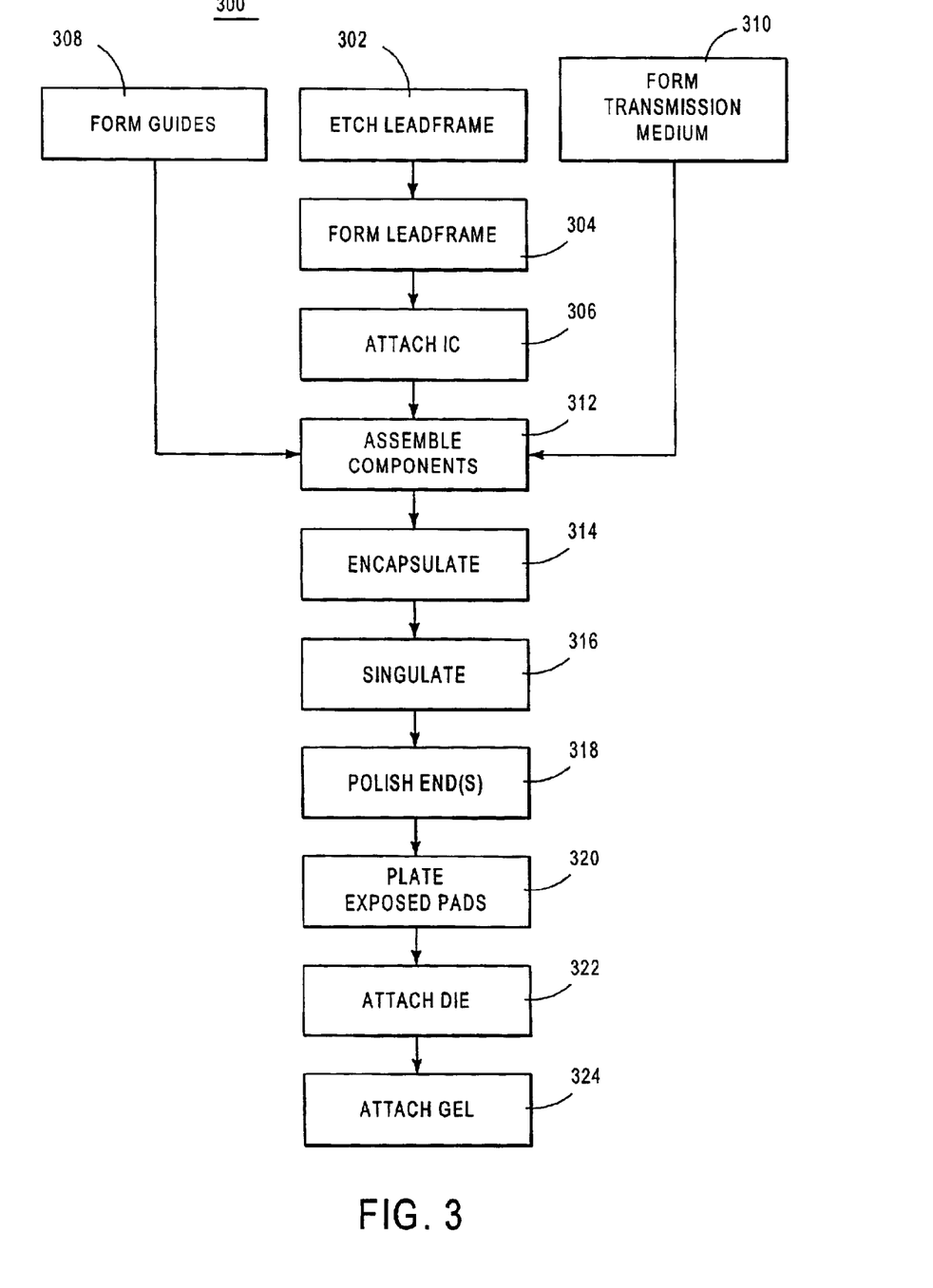
FIG. 3 is a schematic illustration of a process for forming an optical coupler in accordance with the present invention.

FIG. 3 illustrates a method 300 for forming a coupler, such as coupler 102, and attaching an optoelectronic device to the coupler in accordance with the present invention. Method 300 includes the steps of etching electrical connectors (step 302), forming the electrical connectors (step 304), attaching device 108 (step 306), forming guides (step 308), forming transmission medium (step 310), assembling components including guides and transmission medium (step 312), encapsulating the transmission path and at least a portion of the connectors (step 314), singulating the couplers (step 316), polishing the ends of the coupler (optional) (step 318), plating the ends of the leads with material (step 320), attaching an optoelectronic device to the coupler (step 322) and optionally placing index matching gel between the optoelectronic device and a transmission path of the coupler (step 324).

Figure 4:
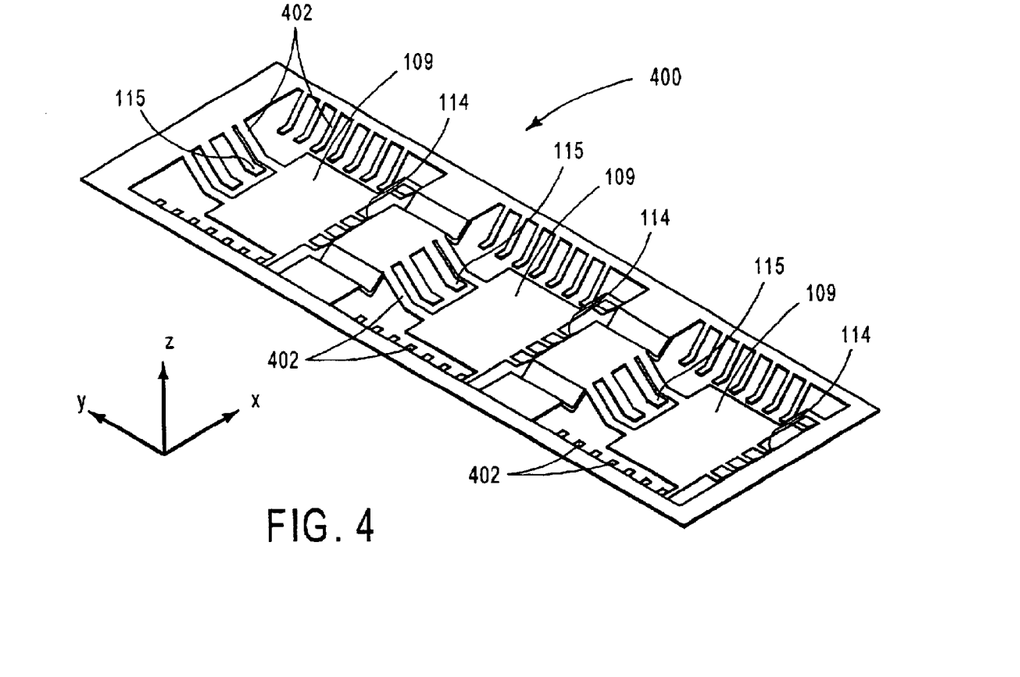
FIG. 4 is a top view illustration of a conductive plate used to form connectors in accordance with the present invention.

In accordance with one embodiment of the invention, steps 302 and 304 includes forming electrical connectors (e.g., connectors 114 and 115) and base 109 from a plate or sheet of conductive material. FIG. 4 illustrates a top perspective view of a patterned sheet of conductive material 400, such as copper, having a thickness of about 70 μm suitable for forming connectors in accordance with the present invention. The sheet may be patterned using, for example, photoresist and suitable etchant, or alternatively, cut to form the desired pattern of leads 402, which eventually form connectors 114 and 115, and base 109. In accordance with the illustrated embodiment, after the sheet is patterned, sheet 400 is formed or bent such that, during assembly of coupler 102, device 108 may be coupled to device 106, while allowing transmission medium (e.g., medium 112) to directly align with the optical input or output of device 106. Leads 402 may be bent in any desired fashion, but are preferably bent such that the leads, alone or in connection with wire bonds or the like, form an electrical connection with an effective ninety-degree turn. In accordance with one aspect of this embodiment, the effective ninety-degree turn is obtained by forming two 135° bends in the leads, as best illustrated in FIG. 1.

Figure 5:
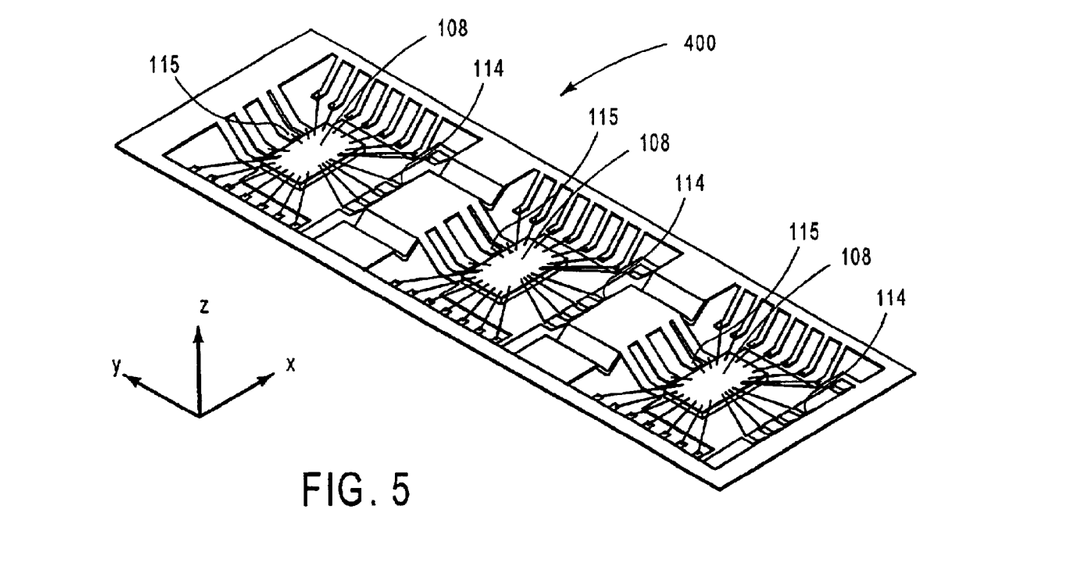
FIG. 5 illustrates a microelectronic device attached to the frame illustrated in FIG. 4 using wire bonds.
Figure 13:
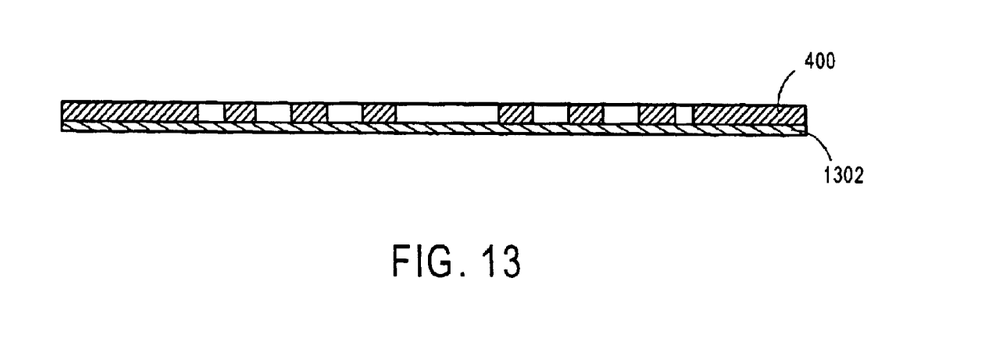

Once sheet 400 has been patterned and formed or bent into shape or a frame, an adhesive tape 1302 or other suitable stiffener may be applied to the backside of frame 400 (as illustrated in FIG. 13) to provide support for portions of frame 400 during manufacture of coupler 102. After sheet 400 is formed, and if desired, tape 1302 is applied to frame 400, device 108 is attached to base portion 109. Device 108 is mechanically coupled to base 116 using a suitable glue such as an epoxy, soldering device 108 to base 109, or the like. Device 108 is then electrically coupled to connectors 114 and 115 using wirebonds (as illustrated in FIG. 5), conductive bumps (illustrated in FIGS. 6 and 7), or other suitable techniques.

Figure 14:
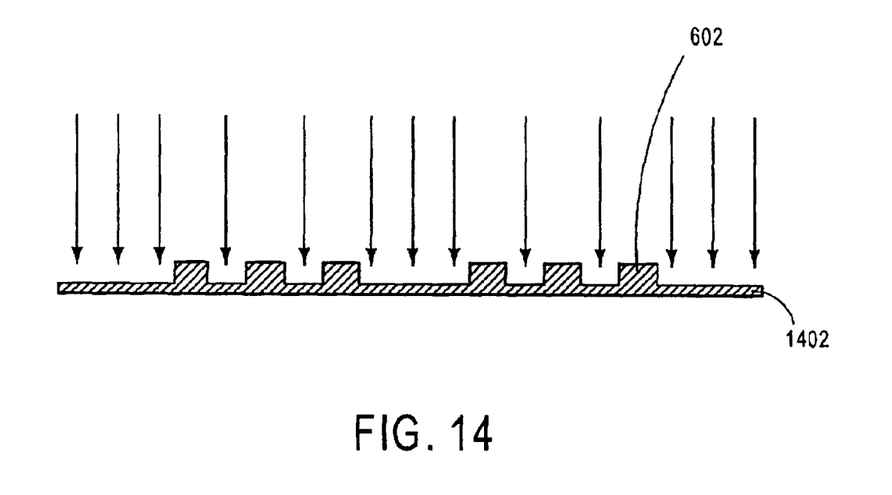
Figure 15:
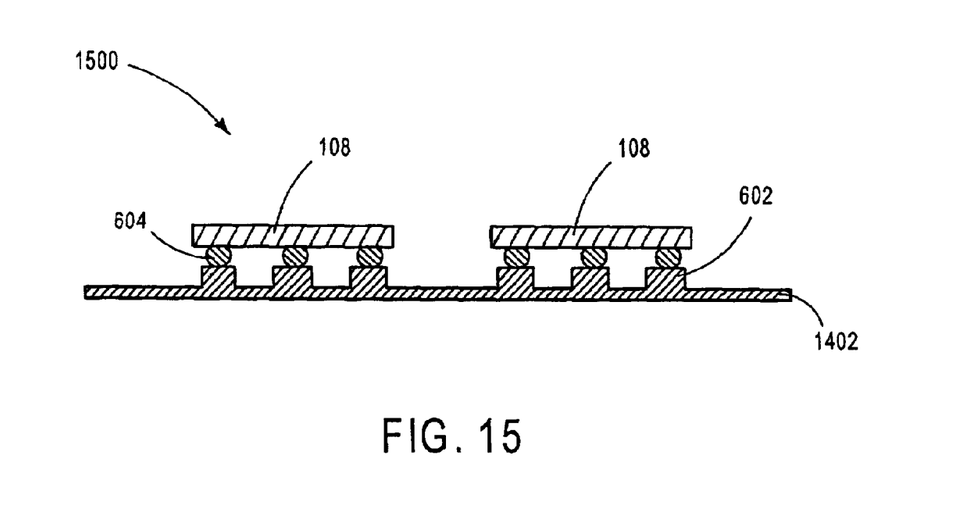

When device 108 is coupled to electrical connectors 114 and 115 using conductive bumps, pedestals 602 may be formed on base portion 109 to facilitate bonding of bumps 604 to base portion 109. Pedestals 602 may be formed using a partial or half-etch process when etching connectors 115, as illustrated in FIG. 14. In accordance with one aspect of this embodiment, pedestals 602 are formed by etching through a portion of frame 400, such that a portion 1402 of the frame remains in tact to provide support for the frame during a portion of process 300. Using a partial etch process rather than a tape process, as described above, may be advantageous because when tape is used, portions of the frame may be susceptible to damage prior to the application of the tape. Device 108 may be attached to pedestals 602 as described herein and as illustrated in FIG. 15.

In accordance with the illustrated embodiment, once device 108 is attached to frame 400, groove sleeves 124 and 126 are attached to or placed on frame 400. Alternatively, sleeves 124 and 126 or other suitable guide may be formed from the sheet of conductive material during steps 302 and 304 of process 300.

Figure 8:
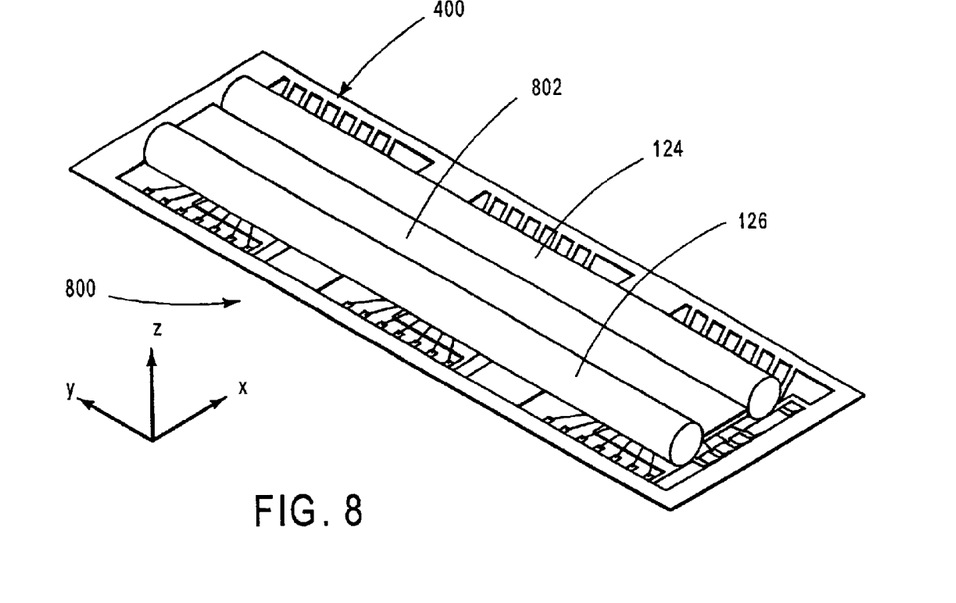
FIGS. 8–11 and 13–19 illustrate structures in accordance with the present invention formed during the fabrication of an optical coupler.

During step 312, transmission medium or spacer material 802 is attached to or placed on frame 400 to form structure 800, illustrated in FIG. 8. The transmission medium material may be attached to frame 400 in any suitable manner; for example, tape, an epoxy, or other suitable glue may be used to attach the medium or a spacer to frame 400.

Figure 9:
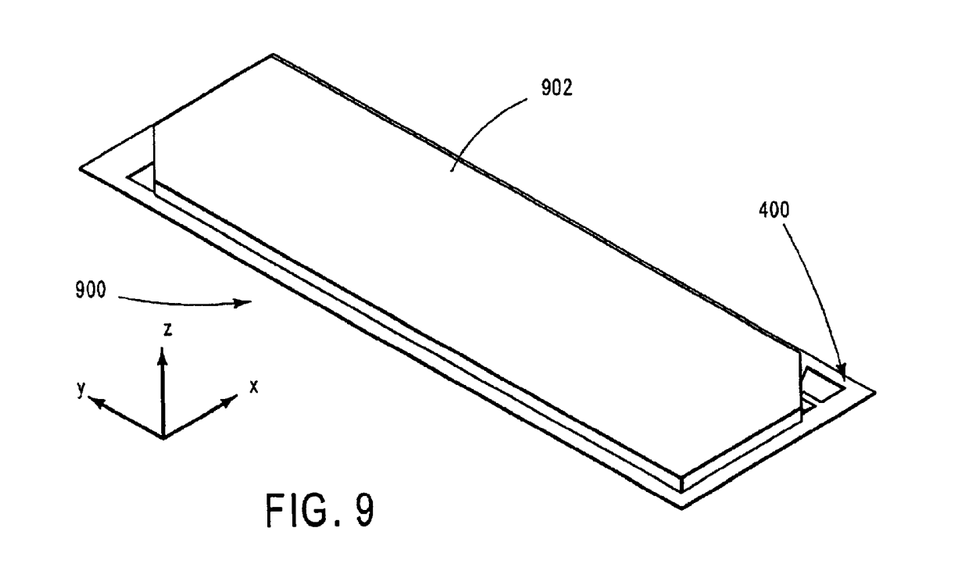

Next, during step 314, an encapsulant material 902 is formed over structure 800 to form structure 900, illustrated in FIG. 9. In accordance with a preferred method of forming an optical coupler of the present invention, encapsulant 902 includes an epoxy resin compound applied using transfer mold technology. However, other suitable encapsulating techniques may also be used in accordance with the present invention.

In the case where tape 1302 is attached to a backside of frame 400, after encapsulant 902 is formed over structure 800, tape 1302 may be suitably removed from frame 400. Using tape 1302 during step 314 may reduce an amount of mold flash on the bottom surface of frame 400. Thus, any mold compound removal processes such as polishing or mold compound debur may be reduced or eliminated.

Figure 16:
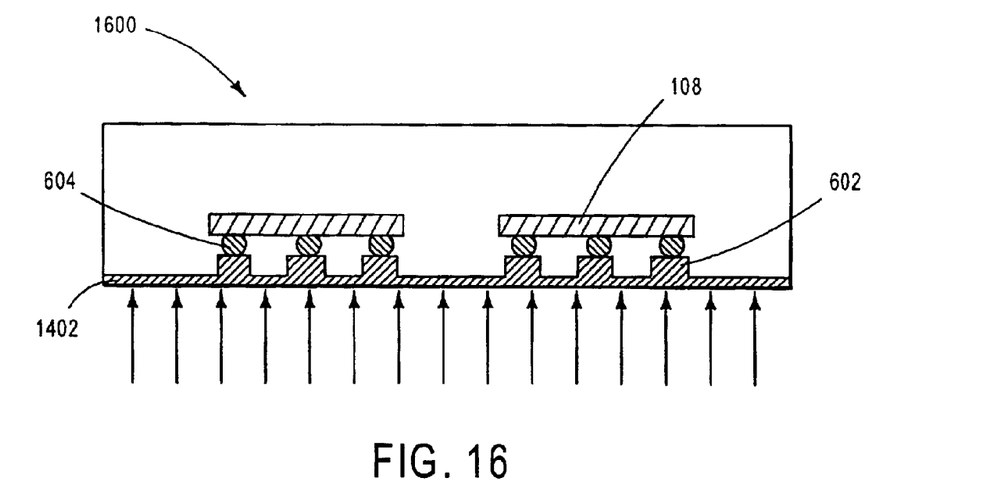
Figure 17:
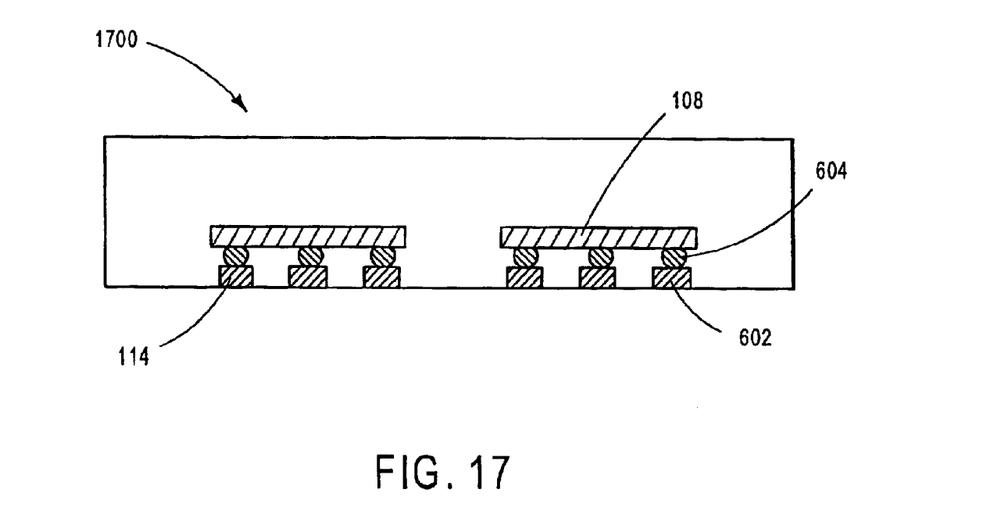

In the case where protrusions 602 are formed using a partial etch process, encapsulant 902 is formed about a top portion of structure 1500 to form structure 1600, illustrated in FIG. 16. After the encapsulant is formed over structure 1500, portion 1402 of the frame may be removed using a suitable etchant to form structure 1700, illustrated in FIG. 17.

Figure 6:
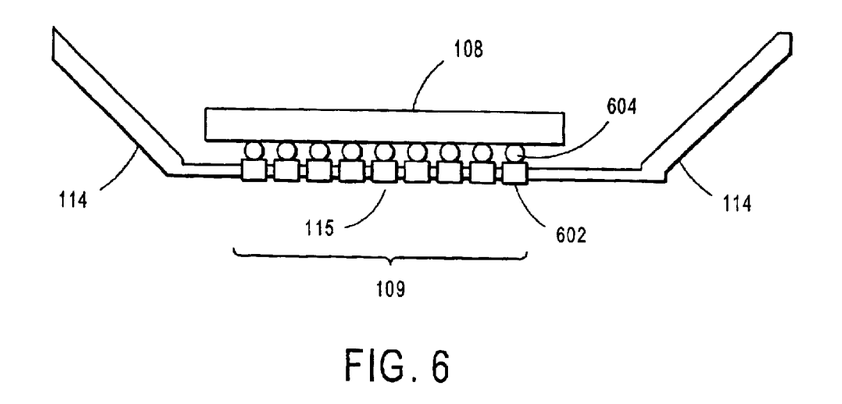
FIGS. 6 and 7 illustrate a microelectronic device attached to the frame illustrated in FIG. 4 using conductive bumps.
Figure 7:
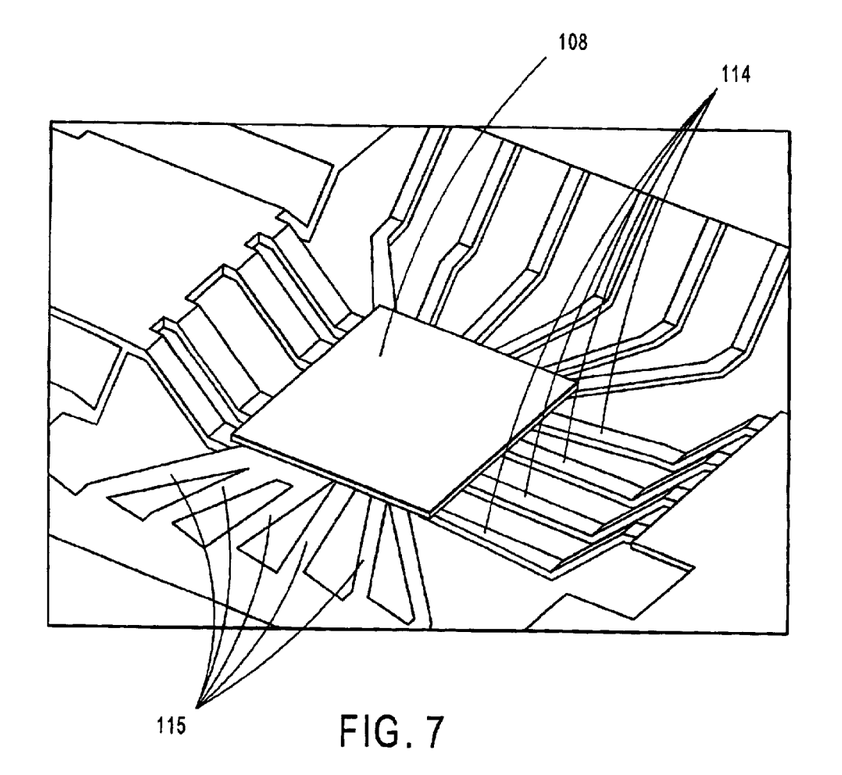
Figure 18:
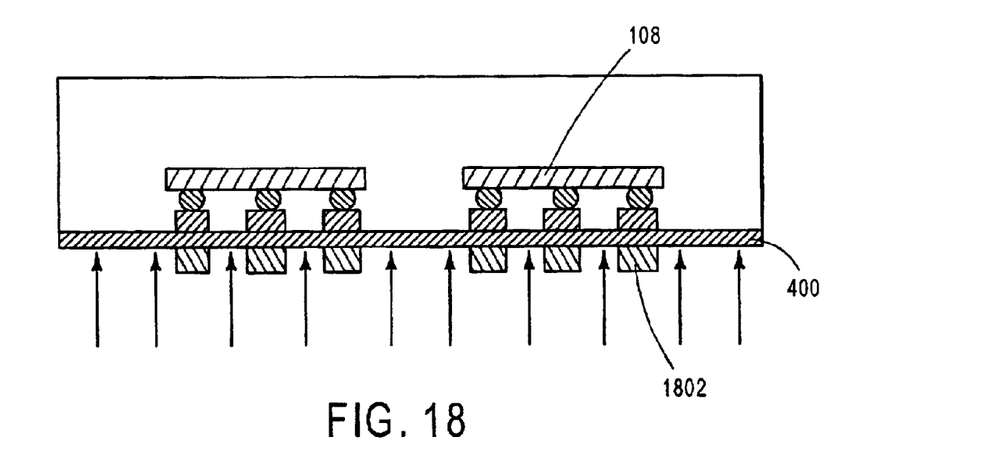
Figure 19:
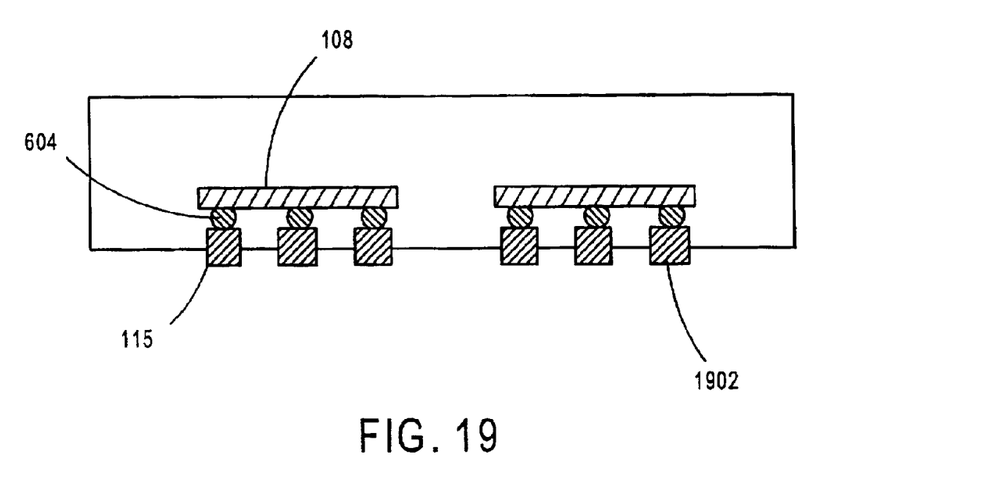

In accordance with one aspect of this embodiment of the invention, a partial etch may be performed on a bottom portion of the frame, such that protrusions 1902 extend beyond a lower surface of connectors 114, as illustrated in FIGS. 6 and 19. Forming connectors 115 such that a portion of the connectors extends beyond lead portions 114 may facilitate direct bonding of leads 115 to substrate 110. Protrusions 1902 may be formed by patterning a bottom surface of frame 400 with an etch resistant material such as photoresist structure 1802, exposing the bottom surface to an etchant, and removing any residual photoresist.

By using the partial etch process described thicker conductive material may be used for frame 400. If desired, lead ends 1006 (illustrated in FIG. 10) may be coined to reduce the conductive material thickness at the ends. Coining the lead ends may be desirable to facilitate lead 114 formation using the same etch process used to form pedestals 602 and/or protrusions 1902.

Figure 10:
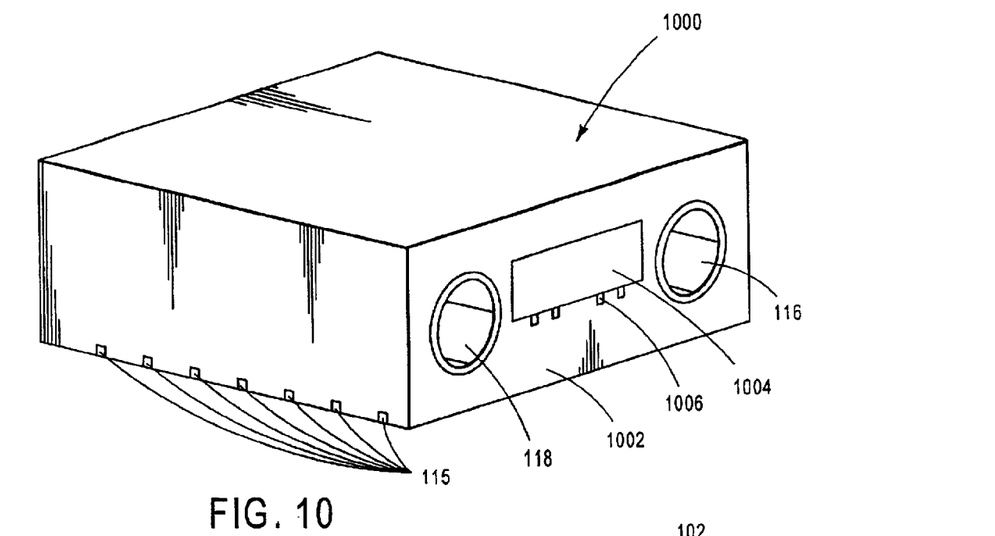

Individual optical coupler structures 1000, illustrated in FIG. 10, are formed during step 316 by singulating the couplers from structure 1000. Step 316 may include sawing, cutting, bending, or otherwise separating individual structures 1000 from one another.

After structures 1000 are separated during step 316, ends of structure 1000, e.g., end 1002 (illustrated in FIG. 10) and end 1102 (illustrated in FIG. 11) may be polished during step 318 to provide a smooth flat surface of transmission medium surface 1004 and a smooth, flat bottom portion 1102 to facilitate plating portions of surface 1102 of connectors 114, 115 and/or base 109.

During step 320, ends of the connectors 114 and 115, and if desired portions of base 109, are plated with a material configured to facilitate coupling of the optical coupler to an optoelectronic device and to assemble coupler 102 to substrate 110. For example, ends 1006 of connectors 114 may be plated with gold or solder to facilitate flip-chip bonding between connectors 114 and optoelectronic device 106 and lead ends 1104 of connectors 115 may be coated with gold or solder to facilitate bonding between coupler 102 and substrate 110.

Figure 11:
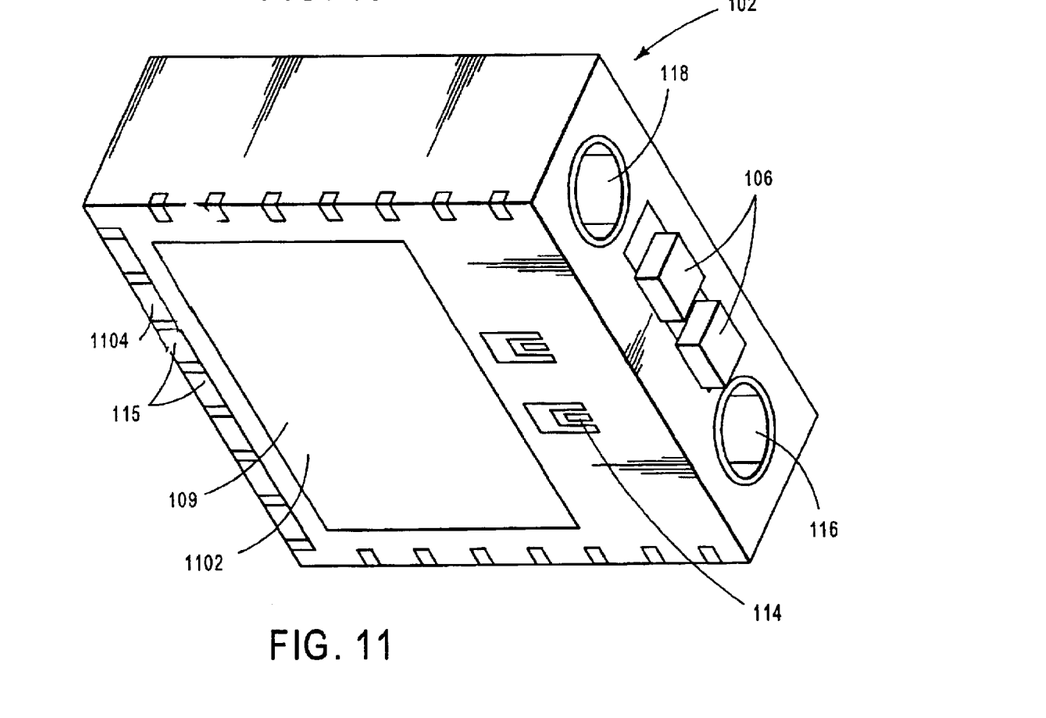

After the coupler 102 is formed, one or more optoelectronic devices 106 is attached to coupler 102 during step 322. By way of example, an array of devices (e.g., an array including 2 to 12 individual VCSELs and/or 2 to 12 detectors) can be attached to coupler 102 using solder bumps, e.g., Controlled Collapse Chip Connection ("C4") bonding techniques, a harness, an electrical adhesive, or surface mount technology. Alternately, devices 106 may be attached to coupler 102, either individually or as an array, using other adhesive materials such as conductive tape, conductive epoxy, or the like. FIG. 11 illustrates a coupler 102 having two optoelectronic devices 106 attached to the coupler.

Figure 12:
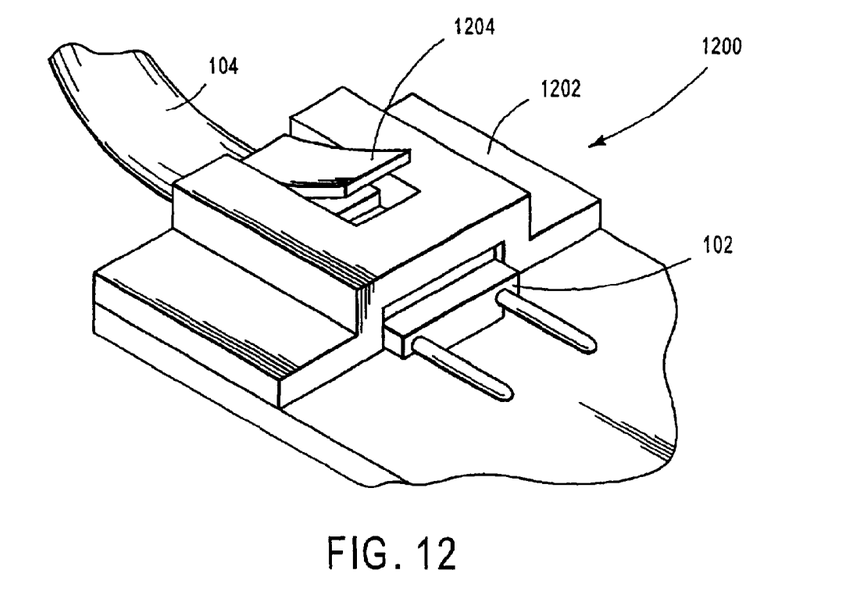
FIG. 12 illustrates a optical coupling system in accordance with the present invention.

Once the optoelectronic devices are attached to coupler 102, fiber ribbon 104 or another suitable waveguide is attached to coupler 102 by inserting guide pins associated with and attached to ribbon 104 through grooves 116 and 118 to form system 100, illustrated in FIGS. 1 and 12. As illustrated in FIG. 12, a system 1200 in accordance with the present invention may also include a housing 1202, which allows removable attachment of fiber ribbon 104 to coupler 102. In the illustrated case, housing 1202 is configured with a tab 1204, which locks in place to secure ribbon 104 to coupler 102. Housing 1202 and tab 1204 may be formed of any suitable material such as injection mold plastic, cast metal, or machined metal.

While the present invention is set forth herein in the context of the appended drawing figures, it should be appreciated that the invention is not limited to the specific form shown. For example, the optical coupler of the present invention may be scaled to accommodate any number of optoelectronic devices and fibers from a ribbon or other waveguide material. Various other modifications, variations, and enhancements in the design and arrangement of the method, apparatus, and system set forth herein, may be made without departing from the spirit and scope of the present invention.

We claim:

1. An optical coupler for coupling an optoelectronic device to an optical fiber and a microelectronic device, comprising:
   a microelectronic device;
   an optical transmission medium comprising a bundle of fused glass fibers disposed proximate the microelectronic device; and
   an encapsulant surrounding at least a portion of the microelectronic device and at least a portion of the transmission medium.

2. The optical coupler of claim 1, further comprising a first electrical connector coupled to the microelectronic device.

3. The optical coupler of claim 2, wherein the first electrical connector comprises a lead portion of a leadframe.

4. The optical coupler of claim 2, further comprising a wirebond connected to the microelectronic device and the first electrical connector.

5. The optical coupler of claim 2, further comprising a conductive bump connected to the microelectronic device and the first electrical connector.

6. The optical coupler of claim 2, further comprising a second electrical connector coupled to the microelectronic device.

7. The optical coupler of claim 6, further comprising a wirebond connected to the microelectronic device and the second electrical connector.

8. The optical coupler of claim 6, wherein the second electrical connector comprises a lead portion of a leadframe.

9. The optical coupler of claim 6, wherein the second electrical connector comprises a conductive bump.

10. The optical coupler of claim 1, wherein the optical transmission medium comprises a material selected from the group consisting of a glass block, a fiber ribbon, a fiber tape, a holographic optical element, and a bundle of fused glass fibers.

11. The optical coupler of claim 1, wherein each of the fused fibers has a core diameter smaller than about 50 microns.

12. The optical coupler of claim 1, wherein the encapsulant comprises silica-filled epoxy material.

13. The optical coupler of claim 1, further comprising guide grooves configured to receive guide pins attached to a fiber ribbon.

14. The optical coupler of claim 1, further comprising a base plate configured to receive the microelectronic device.

15. The optical coupler of claim 1, further comprising die attachment material to facilitate bonding of the connector to a substrate.

16. The optical coupler of claim 1, further comprising conductive tape configured to facilitate coupling the connector to an optoelectronic device.

17. An optical interconnect system comprising the optical coupler of claim 1.

18. An optical coupler for coupling an optoelectronic device to an optical fiber and a microelectronic device, comprising:
    a microelectronic device;
    an optical transmission medium disposed proximate the microelectronic device; and
    an encapsulant surrounding at least a portion of the microelectronic device and at least a portion of the transmission medium;
    wherein the microelectronic device comprises a driver for a light emitting device.

19. The optical coupler of claim 18, wherein the microelectronic device comprises an amplifier for a light detecting device.

20. The optical coupler of claim 18, further comprising:
    an amplifier for a light detecting device.

21. An optical coupler comprising:
    a microelectronic device;
    an encapsulant surrounding at least a portion of the microelectronic device;
    a bundle of fused glass fibers formed in the encapsulant; and
    at least one guide groove formed in the encapsulant, the at least one guide groove configured to receive a pin from a connector attached to a fiber ribbon.

22. The optical coupler of claim 21, further comprising electrical connectors configured to couple the microelectronic device to an optoelectronic device.

23. The optical coupler of claim 22, wherein the electrical connectors comprise a portion of a leadframe.

24. The optical coupler of claim 22, wherein the electrical connectors comprise a conductive bump.

25. The optical coupler of claim 21, further comprising electrical connectors configured to couple the microelectronic device to a substrate.

26. The optical coupler of claim 25, wherein the electrical connectors comprise a portion of a leadframe.

27. The optical coupler of claim 25, wherein the electrical connectors comprise a conductive bump.

28. The optical coupler of claim 21, wherein at least a portion of the encapsulant comprises a transfer mold compound.

29. The optical coupler of claim 21, wherein the microelectronic device comprises an amplifier for a light detecting device.

30. An optical coupler comprising:
    a microelectronic device;
    an encapsulant surrounding at least a portion of the microelectronic device; and
    at least one guide groove formed in the encapsulant, the at least one guide groove configured to receive a pin from a connector attached to a fiber ribbon;
    wherein the microelectronic device comprises a driver for a light emitting device.

31. The optical coupler of claim 30, further comprising:
    an amplifier for a light detecting device.

32. A method of forming an optical coupler, the method comprising the steps of:
    creating electrical connectors;
    attaching a microelectronic device to the electrical connectors;
    forming guides;
    forming a transmission medium;
    assembling components including guides and transmission medium;
    encapsulating at least a portion of the electrical connectors and at least a portion of the microelectronic device; and
    singulating optical couplers.

33. The method of forming an optical coupler of claim 32, wherein the step of forming guides comprises bending a portion of a conductive plate to form a conduit.

34. The method of forming an optical coupler of claim 32, wherein the step of creating electrical connectors comprises providing a leadframe and bending the leads of the leadframe.

35. The method of forming an optical coupler of claim 32, wherein the step of creating electrical connectors comprises patterning a surface of a plate of conductive material, etching the plate of conductive material to form conductive leads, and bending the conductive leads.

36. The method of forming an optical coupler of claim 32, further comprising the step of polishing an end of the transmission medium.

37. The method of forming an optical coupler of claim 32, further comprising the step of coating an end of the electrical connectors with a conductive material.

38. The method of forming an optical coupler of claim 37, wherein the step of coating an end comprises attaching a conductive tape to an end.

39. The method of forming an optical coupler of claim 37, wherein the step of coating an end comprises plating conductive material on the end.

40. The method of forming an optical coupler of claim 32, further comprising the step of attaching guide sleeves to a portion of the electrical connectors.

41. The method of forming an optical coupler of claim 32, further comprising the step of forming a ground plane coupled to a portion of the electrical connectors.

42. The method of forming an optical coupler of claim 32, wherein the step of creating electrical connectors comprises forming the electrical connectors from a sheet of conductive material; the method further comprising the step of providing a stiffener to a bottom portion of the sheet of conductive material.

43. The method of forming an optical coupler of claim 42, further comprising the step of removing the stiffener.

44. The method of forming an optical coupler of claim 32, further comprising the step of forming pedestals on a portion of the electrical connectors, the pedestals configured to facilitate bonding of the connectors to a microelectronic device.

45. The method of forming an optical coupler of claim 44, wherein the pedestals are formed using a partial etch process.

46. The method of forming an optical coupler of claim 32, further comprising the step of coining a portion of the electrical connectors and attaching an optoelectronic device to a coined portion of the electrical connectors.

47. The method of forming an optical coupler of claim 32, further comprising the step of creating protrusions on a bottom surface of the electrical connectors, the protrusions configured to facilitate bonding of a microelectronic device to a substrate.

48. An optical transceiver comprising:

an electrical connector;

an optoelectronic component flip-chip mounted attached to a first portion of the electrical connector;

a microelectronic device attached to a second portion of the electrical connector;

an optical transmission medium made of fiber bundles disposed proximate the electrical connector;

an encapsulant surrounding at least a portion of the connector and at least a portion of the transmission medium; and a guide groove formed within a portion of the encapsulant.

49. An optical transceiver comprising:

an electrical connector;

an optoelectronic component flip-chip mounted to the electrical connector;

a microelectronic device coupled to the electrical connector;

a transmission medium disposed proximate the electrical connector, the transmission medium comprising relay lens elements and anti-reflection coating;

an encapsulant surrounding at least a portion of the connector and at least a portion of the microelectronic device; and a guide groove formed within the encapsulant.

50. An optical system comprising:

an electrical connector;

an optoelectronic device flip-chip mounted to a first portion of the electrical connector;

a microelectronic device electrically coupled to the electrical connector;

a transmission medium transparent in the visible and mid infrared regions of the radiation spectrum disposed proximate the electrical connector, the transmission medium comprising relay lens elements and anti-reflection coating; and an encapsulant surrounding at least a portion of the connector and at least a portion of the microelectronic device.

51. An optical coupler for wavelength division multiplexing comprising:

an electrical connector;

an optoelectronic device flip-chip mounted to the electrical connector;

a wavelength multiplexed transmission medium disposed proximate the electrical connector, the medium comprising relay lens elements and anti-reflection coating;

an encapsulant surrounding at least a portion of the connector and at least a portion of the transmission medium; and a guide groove formed within the encapsulant.

52. An optical coupler for wavelength division demultiplexing comprising:

an electrical connector;

an optoelectronic device flip-chip mounted to the electrical connector;

a wavelength demultiplexing transmission medium disposed proximate the electrical connector, the medium comprising relay lens elements and anti-reflection coating;

a microelectronic device coupled to the electrical connector;

an encapsulant surrounding at least a portion of the connector and at least a portion of the microelectronic device; and a guide groove formed within the encapsulant.

\* \* \* \* \*